United States Patent
Kobayashi

(10) Patent No.: US 7,360,535 B2
(45) Date of Patent: *Apr. 22, 2008

(54) HOT WATER APPARATUS

(75) Inventor: Toshihiro Kobayashi, Nagoya (JP)

(73) Assignee: Paloma Industries, Limited, Nagoya-Shi (JP)

( * ) Notice: Subject to any disclaimer, the term of this patent is extended or adjusted under 35 U.S.C. 154(b) by 270 days.

This patent is subject to a terminal disclaimer.

(21) Appl. No.: 11/003,452

(22) Filed: Dec. 3, 2004

(65) Prior Publication Data

US 2005/0133021 A1    Jun. 23, 2005

(30) Foreign Application Priority Data

Dec. 19, 2003    (JP)    ............... 2003-421824

(51) Int. Cl.
F24H 1/00 (2006.01)

(52) U.S. Cl. ............... 126/350.1; 122/13.01

(58) Field of Classification Search ............ 122/32, 122/14 D, 18.1, 13.1, 367.3; 126/355.1, 126/357.1, 383.1; F22B 1/18
See application file for complete search history.

(56) References Cited

U.S. PATENT DOCUMENTS 4,603,681 A * 8/1986 Clawson ............... 126/110 R
5,184,600 A * 2/1993 Astle, Jr. ............... 126/113
6,345,769 B2 * 2/2002 MacIntyre ............... 237/8 R
6,971,335 B2 * 12/2005 Kobayashi et al. ........... 122/32

FOREIGN PATENT DOCUMENTS

| JP | 2002-039623 | | 2/2002 |
| JP | 2002-098413 | A1 | 4/2002 |
| JP | 2002-195645 | A1 | 7/2002 |
| JP | 2002-333212 | A1 | 11/2002 |

* cited by examiner

Primary Examiner—Steve McAllister
Assistant Examiner—Chuka Ndubizu
(74) Attorney, Agent, or Firm—Burr & Brown

(57) ABSTRACT

A hot water apparatus is provided in which heat recovery is performed as much as possible allowing condensate to be generated and excellent heat efficiency is achieved without providing a plurality of heat exchangers by effectively evaporating generated condensate. In a water heater 1, the condensate evaporator 11 is disposed inclining so that its side facing the high temperature portion of the heat exchanger 10 is at a lower position. The generated condensate drops on the condensate receiver guiding portion 28, and moves by its own weight to the side facing the high temperature portion. Then the condensate is heated and evaporated. In this evaporation, the same amount of heat as that of recovered latent heat is discharged to the exhaust gas, however, sensible heat can be recovered as much as possible without limiting condensate generation in the heat exchanger 10.

2 Claims, 3 Drawing Sheets

HOT WATER APPARATUS

This application claims the benefit of Japanese Patent Application Number 2003-421824 filed Dec. 19, 2003, the entirety of which is incorporated by reference.

FIELD OF THE INVENTION

The present invention relates to a hot water apparatus, for example a water heater, which includes a heat exchanger for heating flowing water by combustion heat of a burner.

BACKGROUND OF THE INVENTION

It should be noted that in the following explanation "exhaust gas" means not only exhaust gas passing through a heat exchanger but also hot exhaust gas generated by burner combustion before heat exchange.

DESCRIPTION OF RELATED ART

Generally, as an example of a hot water apparatus, a water heater has a heat exchanger with which a cold water supply pipe and a hot water outlet are connected, and a burner which heats the heat exchanger. With this configuration, the heat exchanger heats flowing water by combustion exhaust heat from the burner, and hot water is discharged from the hot water outlet.

In this water heater, a heat exchanger of the fin tube type is usually used in which temperature of exhaust gas passing between fins is not even. That is, the temperature of the heat exchanger becomes colder closer to its water entrance side, resulting in that a condensate is often generated at the water entrance side. In order to prevent condensation, heat exchange is limited under the condition that temperature of exhaust gas passing through gaps between the fins at the water entrance side is kept above the dew point (approximately 50-60° C.). According to the above, at the water exit side of the heat exchanger, hot exhaust gas is discharged wastefully even if more heat exchange could be performed without generating condensate.

In order to solve the above problem, a condensing water heater is known, in which another heat exchanger is provided at the downstream of the exhaust route for improving thermal efficiency. In a condensing water heater recited in Japanese Patent Publication of unexamined application No. 2002-195645, a main heat exchanger is provided at the upstream of the exhaust gas route and a secondary heat exchanger is provided at the downstream thereof. In the main heat exchanger sensible heat is recovered under limited heat exchange for the purpose of preventing condensation, and in the secondary heat exchanger provided at the downstream of the main heat exchanger sensible heat and latent heat are recovered until condensate is generated.

In the above-mentioned heat exchange, condensate generated in the secondary heat exchanger becomes acidic, reacting chemically with SOx or NOx in the exhaust gas. Due to this, neutralization process is required before the condensate is discharged into a common drainage route, such as sewage. Then, a condensate neutralization apparatus is required, and thus the cost is fairly expensive. Moreover, it is necessary to change a neutralizing agent used in the neutralization apparatus periodically, which deteriorates utility of the condensing water heater.

In order to solve the above problem, a water heater is proposed in which condensate generated in the secondary heat exchanger is evaporated by being contacted with the exhaust gas as disclosed in Japanese Patent Publication of unexamined application No. 2002-98413.

The above-mentioned water heater has a main heat exchanger, a secondary heat exchanger and a condensate evaporator in a common exhaust gas route. Firstly, sensible heat in the exhaust gas is recovered in the main heat exchanger. Thereafter, condensate is generated, and latent heat and sensible heat which has not been recovered in the main heat exchanger are recovered in the secondary heat exchanger. Lastly, condensate generated in the secondary heat exchanger is evaporated by heat of exhaust gas in the condensate evaporator.

According to this water heater, the same amount of heat as that of latent heat recovered by the secondary heat exchanger is used for condensate evaporation, resulting that latent heat is not recovered. However, recovery efficiency regarding sensible heat is improved compared to an ordinary water heater.

However, in both above-mentioned prior arts, the main heat exchanger and the secondary heat exchanger are provided at two stages, that is, at the upstream and the downstream on the exhaust gas route, which makes the structure of the heat exchanger enlarged and complicated. Therefore, it costs expensive and the needs for downsizing is not satisfied.

Moreover, a large quantity of sensible heat to be recovered remains in the main heat exchanger because heat exchange is limited for the purpose of generating no condensate, so that heat exchange is performed insufficiently in the secondary heat exchanger even if recovering the remained sensible heat is attempted.

In order to solve this problem, an object of the present invention is to provide a hot water apparatus which recovers heat as much as possible allowing condensate to be generated and achieves excellent heat efficiency by effectively evaporating generated condensate without providing a plurality of heat exchangers.

SUMMARY OF THE INVENTION

In order to solve the above problems, in accordance with a first aspect of the present invention, a hot water apparatus includes a burner for burning fuel gas in a combustion chamber, and a heat exchanger for heating flowing water in a heat transfer tube by combustion heat of the burner, wherein condensate generated at a low temperature portion of the heat exchanger is evaporated by hot exhaust gas passing through a high temperature portion of the heat exchanger.

A hot water apparatus in accordance with a second aspect of the present invention, there is provided a hot water apparatus according to the first aspect, wherein a guide means for guiding the generated condensate into a flowing route of hot exhaust gas passing through the high temperature portion of the heat exchanger is provided.

A hot water apparatus in accordance with a third aspect of the present invention, there is provided a hot water apparatus according to the second aspect, wherein the guide means has a condensate receiving and evaporating unit provided at the downstream of the exhaust gas route of the heat exchanger for receiving condensate, and the condensate receiving and evaporating unit guides condensate from the side facing the low temperature portion of the heat exchanger to the side facing the high temperature portion thereof.

A hot water apparatus in accordance with a fourth aspect of the present invention, there is provided a hot water apparatus according to the second aspect, wherein the guide means has a condensate receiving and evaporating unit provided at the downstream of the exhaust gas route of the heat exchanger for receiving condensate, and the condensate receiving and evaporating unit is disposed inclining so that its side facing the high temperature portion of the heat exchanger is at the lowest position.

In the hot water apparatus according to the first aspect having the above-mentioned configuration, water passing through a transfer tube of the heat exchanger is heated by combustion heat of a burner. As the heat exchanger becomes colder at the water entrance side, exhaust gas which is performing heat exchange with cold water becomes low temperature, resulting that condensate is generated.

On the other hand, since the heat exchanger becomes hot at the water exit side, exhaust gas passing through the heat exchanger also become shot, there by making it difficult to generate condensate. Thus, generated condensate in a low temperature portion of the heat exchanger can be evaporated efficiently by hot exhaust gas passing through a hot portion thereof.

In other words, in the heat exchanger, heat is recovered from exhaust gas as much as possible without limiting condensate generation. Thereafter, hot exhaust gas at a high temperature portion, which is generated by temperature nonuniformity of the exhaust gas, evaporates condensate generated at a low temperature portion.

Consequently, high heat efficiency can be obtained without providing a plurality of heat exchangers, such as a main heat exchanger and a secondary heat exchanger in the exhaust gas route. Moreover, as condensate generated in the heat exchanger can be evaporated effectively, a neutralization apparatus can be omitted or simplified.

Therefore, it is possible to provide a hot water apparatus having excellent heat efficiency with low cost.

In the hot water apparatus according to the second aspect having the above-mentioned configuration, a guide means guides condensate generated at the low temperature portion of the heat exchanger to a portion where hot exhaust gas flows. Therefore, condensate is surely heated by hot exhaust gas.

Further, in the hot water apparatus according to the third aspect having the above-mentioned configuration, after condensate generated at a low temperature portion of the heat exchanger is received by a condensate receiving and evaporating unit, it is guided to the side facing a high temperature portion of the heat exchanger. While the condensate is guided, the exhaust gas prompts the evaporation of the condensate, and therefore, it is possible to evaporate condensate more efficiently.

In the hot water apparatus according to the fourth aspect having the above-mentioned configuration, after condensate generated at a low temperature portion of the heat exchanger is received by a condensate receiving and evaporating unit, it is guided to the side facing a high temperature portion of the heat exchanger by its own weight. Therefore, condensate can be guided to a portion where hot exhaust gas flows without any difficulties. Moreover, while the condensate is guided, the exhaust gas prompts the evaporation of the condensate, so that it is possible to evaporate condensate more efficiently.

DETAILED DESCRIPTION OF THE INVENTION

To clarify the above-described configuration and operation of the present invention, the preferred embodiment of the present invention will be explained below.

Figure 1:
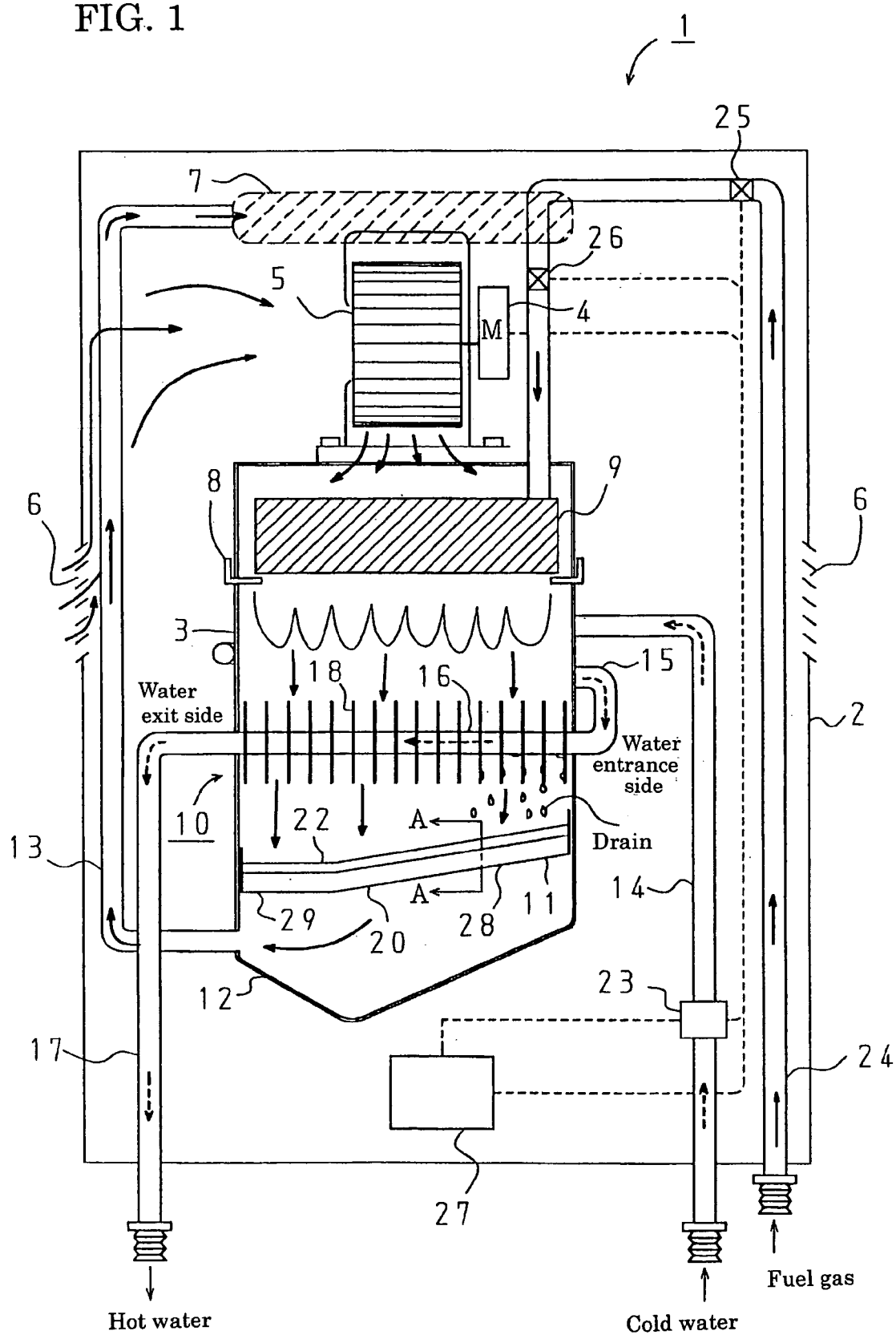
FIG. 1 is a schematic view of a water heater as one embodiment.

As shown in FIG. 1, a water heater 1 as one embodiment of the present invention includes a main body 2 having a combustion chamber 3 above which a blower 5 connected with a DC motor 4 is provided. The main body 2 has an inlet 6 for supplying air for combustion and an outlet 7 for discharging exhaust gas to the upside of the inlet 6.

In the combustion chamber 3, provided are, from the upstream side, a burner 9 disposed on an installation plate 8 with a flame port reversed for burning mixed gas made of fuel gas and primary air from the blower, a heat exchanger 10 of the fin tube type for recovering sensible heat of exhaust gas from the burner 9 and latent heat of condensate generated therein, a condensate evaporator 11 for receiving and evaporating condensate, and an exhaust gas hood 12 for discharging exhaust gas which heated the heat exchanger 10 and a condensate evaporator 11. This exhaust gas hood 12 is a bowl-shaped hood with a large opening facing the upper side. At the lateral side of the exhaust gas hood 12 an exhaust duct 13 is connected, whose opening at the upper end is directed to the outlet 7.

Water tubes provided in the main body 2 are, from the upstream side, a cold water supply pipe 14 for supplying cold water, a winding tube 15 which surrounds the combustion chamber 3 from the outside, a heat transfer tube 16 provided with the heat exchanger 10, and a hot water outlet 17 for discharging hot water. Among these water tubes, the heat transfer tube 16 is made of stainless steel with excellent corrosion-proof, and the other tubes are made of copper.

The heat transfer tube 16 has many fins 18 which are made of stainless steel and disposed with even gaps for absorbing combustion heat. Because of this, the heat exchanger 10 is colder at the water entrance side, and warmer at the water exit side. The fin gaps are designed so that at the water exit side the temperature of passing exhaust gas is above the dewpoint (approximately 50-60° C.) in order to prevent condensate generation, and at the water entrance side the temperature of passing exhaust gas is not limited and thus heat exchange is performed until condensate is generated.

Figure 2:
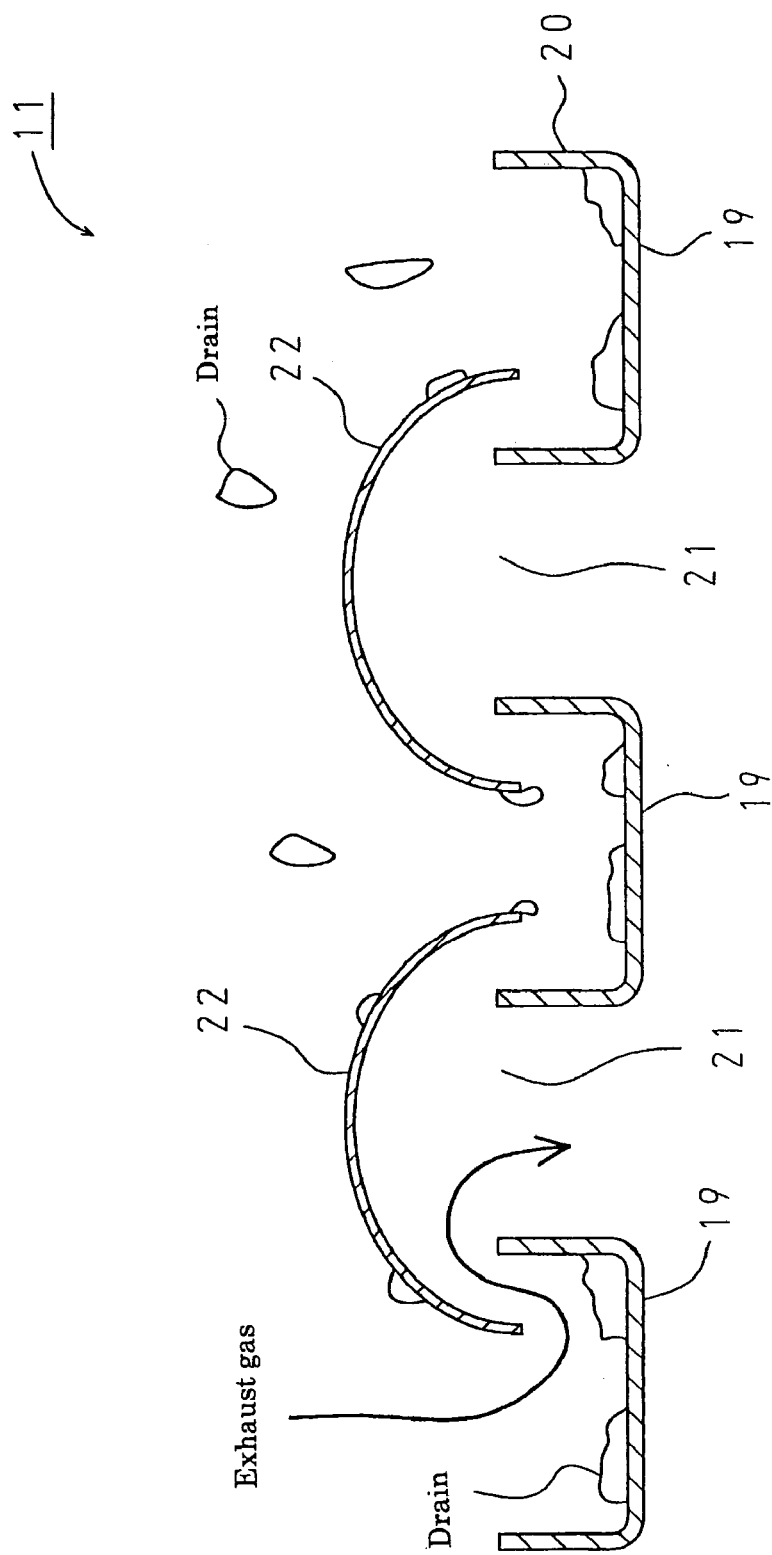
FIG. 2 is a cross-sectional view of a condensate evaporator as one embodiment.
Figure 3:
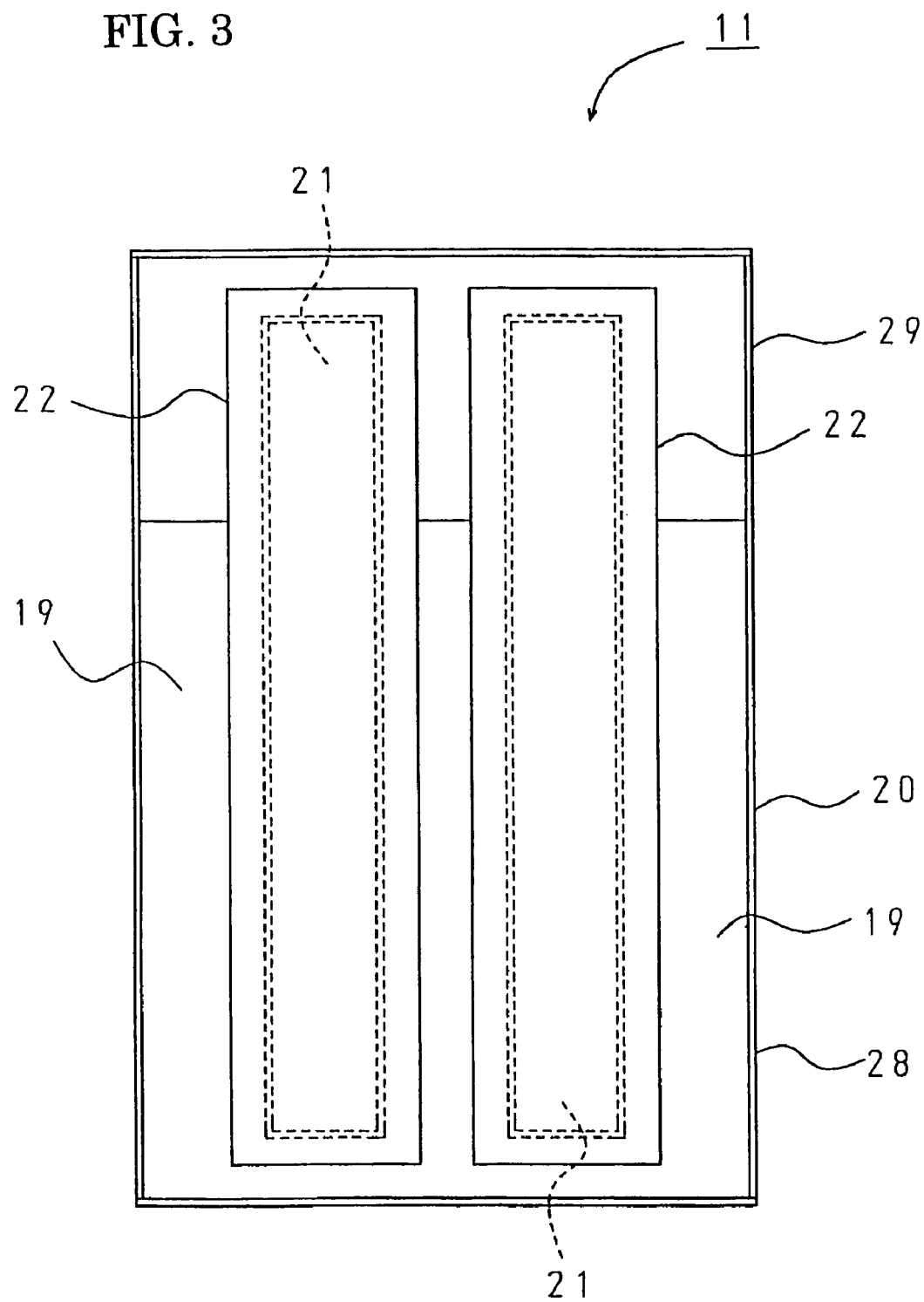
FIG. 3 is a plain view of a condensate evaporator as one embodiment.

As shown in FIGS. 1, 2 and 3, the condensate evaporator 11 has a condensate receiving portion 20 and a condensate cover 22. In the condensate receiving portion 20, three elongate condensate receivers 19, 19 and 19 are aligned transversely, each of which is formed into U-shape in cross section and has lateral ends connected integrally with each other. The condensate cover 22 is reverse U-shaped in cross section for covering the upper part of the exhaust gap 21 between the condensate receivers 19, 19 and 19 to prevent the condensate from dropping on the exhaust gas hood 12 etc. FIG. 2 is a cross sectional view taken along the chain line A-A shown in FIG. 1. The condensate receiver 19 is bent to have the inclination of small degree, so that a condensate receiver guiding portion 28 and a condensate evaporation portion 29 are formed. On installation of the condensate receivers 19, 19 and 19, when the condensate evaporation portion 29 is disposed horizontally, the condensate receiver guiding portion 28 extends upward with an angle from the condensate evaporation portion 29.

The condensate evaporator 11 is provided below the heat exchanger 10 and large enough to cover all the under area thereof. In the condensate evaporator 11, the condensate evaporation portion 29 is set horizontally under the water exit side of the heat exchanger 10. With this configuration, the condensate receiver guiding portion 28 is inclined, in which one end facing a low temperature portion of the heat exchanger 10, that is, its water entrance side is located at a higher position than the other end facing a high temperature portion of the heat exchanger 10, that is, its water exit side.

The cold water supply pipe 14 has a water side control unit 23 having a water flow sensor or a water governor. A gas tube 24 for the burner 9 has a main electromagnetic valve 25 and a proportional valve 26. In addition, the water flow sensor in the water side control unit 23, the main electromagnetic valve 25, the proportional valve 26 and the DC motor 4 etc. are electrically connected to a burner controller 27 for controlling combustion of the water heater 1.

In the water heater 1 configured in this manner, when a water tap (not shown) is opened, water flows into the cold water supply pipe 14 (a dotted arrow in the drawings), and a burner controller 27 detects a signal from the water flow sensor in the water side control unit 23 and performs control operation. Then, the blower 5 starts to rotate driven by the DC motor 4. When a predetermined purge is completed, the main electromagnetic valve 25 and the proportional valve 26 of the burner 9 are opened and fuel gas (an arrow in the drawings) is supplied to the burner 9, and then the burner 9 is ignited by an igniter (not shown).

When the ignition is completed, proportional control is started. That is, if there is a difference between a set temperature and a temperature detected by a warm water temperature thermistor (not shown), the burner controller 27 detects the difference and sends a signal to the proportional valve 26, whereby an amount of fuel gas is continuously changed to maintain the temperature of hot water from the exit of the heat exchanger 10 at a predetermined level. Moreover, according to changes of an amount of the fuel gas by means of the proportional valve 26, the burner controller 27 sends a signal to the DC motor 4 of the blower 5 and rotating speed of the blower 5 is changed accordingly. As a result, it is possible to obtain a predetermined relationship between an amount of fuel gas and air supply.

In this combustion control, along with the operation of the blower 5, air is suctioned into the main body 2 through the inlet 6 provided therewith, and the air is guided to the burner 9 as combustion air. Around the flame port of the burner 9, mixed air is burned to generate a flame, and combustion is completed when the flame reaches to the upstream of the heat exchanger 10 (that is, complete combustion).

Hot exhaust gas from the burner 9 passes through gaps between the fins 18 of the heat exchanger 10 by means of the blower 5 for heating water which flows in the heat transfer tube 16. Thereafter, the exhaust gas heats the condensate evaporator 11 and is discharged to the outside of the apparatus through the outlet 7. In the condensate evaporator 11, the exhaust gas passes through a space between the condensate cover 22 and the exhaust gap 21.

As the heat exchanger 10 becomes colder at its water entrance side, the exhaust heat becomes low temperature by heat exchange with flowing water, whereby condensate is generated. On the other hand, at its water exit side the heat exchanger is hot, so that the exhaust heat is still hot even if passing through the heat exchanger 10, which prevents condensate generation.

The generated condensate is received at the condensate evaporator 11 provided right under the heat exchanger 10. Some of the condensate falls down on the condensate cover 22 and is lead to the condensate receiver 19. The condensate evaporator 11 is disposed inclining so that its side facing the high temperature portion of the heat exchanger is at a lower position. As a result, the condensate generated in the low temperature portion of the heat exchanger 10 drops on the condensate receiver guiding portion 28, and moves by its own weight to the side facing the high temperature portion of the heat exchanger 10 where hot exhaust gas flows. Thereafter, the condensate collected on the condensate evaporation portion 29 is heated, whereby the condensate is evaporated. In this evaporation, the same amount of heat as that of recovered latent heat is discharged to the exhaust gas, however, sensible heat can be recovered as much as possible without limiting condensate generation in the heat exchanger 10. Thereafter, hot exhaust gas at a high temperature portion, which is generated by temperature nonuniformity of the exhaust gas, evaporates condensate generated at a low temperature portion. It should be noted that the condensate cover 22 also serves as a guide for temporarily guiding the exhaust gas to the condensate in the condensate receiver 19.

Consequently, high heat efficiency can be obtained without providing a plurality of heat exchangers, such as a main heat exchanger and a secondary heat exchanger in the exhaust gas route. Moreover, since condensate generated in the heat exchanger 10 can be evaporated effectively, a neutralization apparatus can be omitted or simplified.

Therefore, it is possible to provide a hot water heater 1 having excellent heat efficiency with low cost.

Moreover, after condensate generated at a low temperature portion of the heat exchanger 10 is received by a condensate evaporator 11, it is lead by its own weight from the condensate receiver guiding portion 28 to the condensate evaporation portion 29, that is, the side facing a high temperature portion of the heat exchanger 10. Therefore, condensate can be guided to a portion where hot exhaust gas flows without any difficulties, so that the condensate is heated by exhaust gas without fail.

Moreover, while the condensate is guided in the condensate receiver guiding portion 28, the exhaust gas prompts the evaporation of the condensate, so that it is possible to evaporate condensate more efficiently. Moreover, the exhaust gas passes through a space between the condensate cover 22 and the exhaust gap 21, so that the condensate in the condensate receiver 19 is heated directly by the exhaust gas. Therefore, the condensate can be evaporated more efficiently.

The above description of the embodiment of the present invention has in no way been provided for the purpose of limiting the present invention, and it is of course possible to diversely embody the present invention within the scope not departing from the essential points of the present invention.

As an altered embodiment, it is possible to provide a simplified neutralization apparatus for neutralizing some of generated condensate to be discharged outside of an apparatus, unlike the present invention in which all generated condensate is evaporated without discharging the same outside of an apparatus. In this case, all sensible heat as well as some latent heat can be recovered when only the simplified neutralization apparatus is provided, thereby heat efficiency can be further improved.

This invention is applicable to a hot water apparatus which heats flowing water by combustion heat of a burner and discharges hot water.

What is claimed is:

1. A hot water apparatus comprising:
a burner for burning fuel gas in a combustion chamber;
a heat exchanger for heating flowing water in a heat transfer tube by combustion heat of the burner; and
guide means for guiding condensate generated at a low temperature portion of the heat exchanger into a flowing route of hot exhaust gas passing through a high temperature portion of the heat exchanger such that the condensate is evaporated by the hot exhaust gas passing through the high temperature portion, the guide means having a condensate receiving and evaporating unit provided at the downstream of the exhaust gas route of the heat exchanger for receiving the condensate, and said condensate receiving and evaporating unit guides condensate from the side facing the low temperature portion of the heat exchanger to the side facing the high temperature portion thereof,
wherein the burner directly heats the heat exchanger.

2. A hot water apparatus comprising:
a burner for burning fuel gas in a combustion chamber;
a heat exchanger for heating flowing water in a heat transfer tube by combustion heat of the burner; and
guide means for guiding condensate generated at a low temperature portion of the heat exchanger into a flowing route of the hot exhaust gas passing through a high temperature portion of the heat exchanger such that the condensate is evaporated by the hot exhaust gas passing through the high temperature portion, the guide means having a condensate receiving and evaporating unit provided at the downstream of the exhaust gas route of the heat exchanger for receiving the condensate, and said condensate receiving and evaporating unit is disposed inclining so that its side facing the high temperature portion of the heat exchanger is at the lowest position,
wherein the burner directly heats the heat exchanger.

* * * * *